Patented Oct. 10, 1922.

1,431,671

UNITED STATES PATENT OFFICE.

WILHELM KOLLE, OF FRANKFORT-ON-THE-MAIN, AND ARTHUR BINZ, OF BERLIN, GERMANY, ASSIGNORS TO FARBWERKE VORM. MEISTER LUCIUS & BRÜNING, OF HOECHST-ON-THE-MAIN, GERMANY, A CORPORATION OF GERMANY.

STABLE ARSENO-BENZENE DERIVATIVES AND PROCESS OF MAKING SAME.

No Drawing.   Application filed October 20, 1921.   Serial No. 509,169.

*To all whom it may concern:*

Be it known that we, W. KOLLE, and ARTHUR BINZ, citizens of Germany, residing at Frankfort-on-the-Main and Berlin, Germany, respectively, have invented certain new and useful Improvements in Stable Arseno-Benzene Derivatives and Process of Making Same, of which the following is a specification.

As is known, the diaminodioxyarsenobenzene and its derivatives have the disadvantage, that they can be used only in quite freshly prepared solutions, because their solutions very quickly decompose and consequently their toxicity increases while their spirillocide action diminishes.

Now we have made the surprising discovery that by mixing aqueous solutions of sulphoxylate of 3.3′-diamino-4.4′-dioxyarsenobenzene and the sodium salt of the silver compound of 3.3′-diamino-4.4′-dioxyarsenobenzene, a new substance is obtained which, unlike the components of which said substance consists, keeps well for many hours in aqueous solution as well as in the air, without formation of any precipitate or increase of toxicity or any loss of its therapeutical efficiency. This new solution is therefore of great practical value and constitutes an important advance from a technical and therapeutical point of view. When there is substituted for the silver compound of the sodium salt of the diaminodioxyarsenobenzene the sodium salt itself, the reaction occurs in like manner, as is evident from the fact that, when introducing carbon dioxide into the reaction-mixture, there is no precipitation of dioxydiaminoarsenobenzene.

The production of stable compounds is not limited to the above described special cases of combinations of certain arsenobenzene derivatives with the methylene sulfoxylate of 3.3′-diamino-4.4′-dioxyarsenobenzene, but there are quite generally obtained products of particular stability by combining sulfoxylates of the arsenobenzenes with other arsenobenzene derivatives. Moreover we have found that the increased stability is not limited to the combination with sulfoxylates of the arsenobenzenes, but that quite an analogous effect is produced by the admixture of carbamates of the arsenobenzenes. Also such combinations as contain carbamates and sulfoxylates together, give the same result.

The combination of the several components may be effected either by making the substances themselves or by combining solutions of them.

The following examples illustrate our invention:

1. 3 gr. of sulphoxylate of 3.3′ diamino-4.4′-dioxyarsenobenzene and 3 gr. of the silver compound of the sodium salt of 3.3′ diamino-4.4′ dioxyarsenobenzene are mixed in a powdered form and then stirred with 5 ccm. of water. When carbon dioxide is introduced into the solution thus obtained, there is no precipitation whereas such precipitation would immediately occur in presence of any unaltered silver compound of the sodium salt. Furthermore, when the solution is allowed to stand for some time it gives, on addition of common salt, no precipitate, a fact which also proves that the silver compound of the sodium salt of 3.3′-diamino-4.4′ dioxyarsenobenzene is no longer present as such, but has entered into reaction, for a solution of the silver compound precipitates on addition of sodium chloride if it has stood for some time.

2. 3 gr. of sulphoxylate of 3.3′-diamino-4.4′-dioxyarsenobenzene are dissolved in 3 ccm. of water and likewise 3 gr. of the sodium salt of 3.3′-diamino-4.4′-dioxyarsenobenzene in 3 ccm. of water. Any precipitate which may be formed is redissolved by adding a small quantity of caustic soda lye. When the two solutions have been mixed, there is no separation of dioxydiamino arsenobenzene on introducing carbon dioxide, a fact which proves that the sodium salt of the 3.3′-diamino 4.4′ dioxyarsenobenzene is no longer present as such, but has combined with the sulfoxylate of the diaminodioxyarsenobenzene.

| Further examples. | 1. Component in 10 ccm. of water. | 2. Component in 10 ccm. of water. | Properties of the mixture. |
|---|---|---|---|
| I. | 1 gr. of 4-amino-arsenophenyl-dimethyl-pyrazolon carbamate; when diluted with water there will be a precipitate after a few minutes. | 1 gr. of 4-amino-arsenophenyl-dimethyl-pyrazolon-methylene-sulfoxylate. | When diluted with water there is no precipitate. |
| II. | The same as in Example I. | 1 gr. of 3.3'-diamino-4'-dioxy-arsenobenzene-methylene-sulfoxylate. The solution, when kept in storage is decomposable, oxidizable and toxic. | When diluting the solution with water and keeping it in storage, it is stable not oxidizable and not toxic. |
| III. | 0.5 gr. of 4-amino-arsenophenyl-dimethyl-pyrazolon-carbamate; when diluted with water there will be a precipitate after a few minutes. | 1 gr. of 3.3 diamino-4.4'-dioxy-arsenobenzene-methylene-sulfoxylate; the solution when kept in storage, is decomposable, oxidizable and toxic. | When diluting the solution with water and keeping it in storage it is stable, little oxidizable and there is no essential increase of the toxicity. |
| IV. | 0.5 gr. of dimethyl-hexaminoarsenobenzene. This assumes when exposed to the air immediately a red color and is toxic when kept in storage. | 1 gr. of 3.3-diamino-4.4 dioxyarsenobenzene methylene sulfoxylate; the solution, when kept in storage, is decomposable, oxidizable and toxic. | When kept in storage it is stable, not oxidizable, does not turn red when exposed to the the air and is not toxic. |
| V. | 1 gr. of dimethyl-hexaminoarsenobenzene turns immediately red when exposed to the air and is toxic when kept in storage. | 10 ccm. of the mixture of Example I. | Does not turn red when exposed to the air; and is not toxic when kept in storage. |
| VI. | The same as in Example III. | 1 gr. of the sodium salt of 4-amino-arsenophenyl-dimethyl-pyrazolonglycine. | Is stable when diluted with water. |

Having now described our invention, what we claim is:

1. The process of making arsenical preparations which are stable in solution, which comprises mixing water-soluble arsenobenzene compounds represented by the formula $R.NH.R_1$ in which R stands for any arsenobenzene residue and $R_1$ stands for sulfoxylate or carbamate residue with other water-soluble arsenobenzene compounds.

2. The process of making arsenical preparations which are stable in solution which comprises combining in solution a water-soluble arsenobenzene compound represented by the formula $R.NH.R_1$ in which R stands for any arsenobenzene residue and $R_1$ stands for sulfoxylate or carbamate residue with other water-soluble arsenobenzene compounds.

3. As new products, bodies containing arsenobenzene compounds represented by the formula $R.NH.R_1$ in which R stands for any arsenobenzene residue and $R_1$ stands for sulfoxylate or carbamate residue in combination with other arsenobenzene compounds.

4. As new products, bodies containing arsenobenzene compounds represented by the formula $R.NH.R_1$ in which R stands for any arsenobenzene residue and $R_1$ stands for sulfoxylate or carbamate residue chemically combined with other arsenobenzene compounds.

In testimony whereof, we affix our signatures.

WILHELM KOLLE.
ARTHUR BINZ.